US012747108B2

(12) United States Patent
Oltra Valero et al.

(10) Patent No.: US 12,747,108 B2
(45) Date of Patent: Sep. 29, 2026

(54) SYSTEMS FOR CONVEYING ARTICLES

(71) Applicant: Syntegon Telstar Technologies S.L.U., Terrassa (ES)

(72) Inventors: Raul Oltra Valero, Sabadell (ES); Raul Cobo Molina, Santpedor (ES)

(73) Assignee: Syntegon Telstar Technologies S.L.U., Terrassa (ES)

( * ) Notice: Subject to any disclaimer, the term of this patent is extended or adjusted under 35 U.S.C. 154(b) by 63 days.

(21) Appl. No.: 18/906,339

(22) Filed: Oct. 4, 2024

(65) Prior Publication Data

US 2025/0026575 A1 Jan. 23, 2025

Related U.S. Application Data

(63) Continuation of application No. PCT/EP2023/058867, filed on Apr. 4, 2023.

(30) Foreign Application Priority Data

Apr. 4, 2022 (EP) .................................... 22382316

(51) Int. Cl.
*B65G 21/20* (2006.01)

(52) U.S. Cl.
CPC ...... *B65G 21/2072* (2013.01); *B65G 2207/26* (2013.01)

(58) Field of Classification Search
CPC ............ B65G 21/2072; B65G 2207/26; B65G 47/256
USPC ....................................................... 198/836.3
See application file for complete search history.

(56) References Cited

U.S. PATENT DOCUMENTS

| | | | | | |
|---|---|---|---|---|---|
| 3,538,991 | A * | 11/1970 | Garrett | B65G 47/1471 | 198/530 |
| 3,666,082 | A * | 5/1972 | Riggs | B65G 21/2072 | 198/840 |
| 4,642,975 | A * | 2/1987 | Langen | B65B 59/003 | 198/836.3 |
| 5,211,280 | A * | 5/1993 | Houde | B65G 21/2072 | 198/836.3 |
| 5,682,976 | A * | 11/1997 | Jorgensen | B65G 21/2072 | 198/836.3 |

(Continued)

FOREIGN PATENT DOCUMENTS

JP 2018144843 A 9/2018

OTHER PUBLICATIONS

International Search Report, PCT/EP2023/058867, Sep. 6, 2023, 5 pages.

*Primary Examiner* — Mark A Deuble
(74) *Attorney, Agent, or Firm* — Edell, Shapiro & Finnan, LLC

(57) ABSTRACT

The present disclosure relates to a system for conveying articles in an aseptic environment. The system includes at least one conveyor belt, a first sidewall portion and a second sidewall portion. The conveyor belt, and the first and second sidewall portions define a conveyor path portion. Further, at least one of the first and second sidewall portions is a displaceable wall portion, and it is configured to adjust a width of the conveyor path portion to a width of the conveyed article. The displaceable wall portion includes a guided portion configured to be displaced along a guide. The guided portion and the guide are configured to be sanitized according to GMP standards.

18 Claims, 4 Drawing Sheets

(56) References Cited

U.S. PATENT DOCUMENTS

| | | | | |
|---|---|---|---|---|
| 6,050,396 | A * | 4/2000 | Moore | B65G 21/2072 198/836.3 |
| 6,244,429 | B1 | 6/2001 | Drewitz et al. | |
| 6,305,528 | B1 | 10/2001 | Leonard | |
| 6,378,695 | B1 | 4/2002 | Rinne | |
| 8,770,392 | B2 | 7/2014 | Berger et al. | |
| 8,965,787 | B2 * | 2/2015 | Bonev | G06Q 30/0252 707/769 |
| 9,132,931 | B2 | 9/2015 | Franzaroli | |
| 9,481,524 | B2 * | 11/2016 | Bell | B65G 21/2063 |
| 2011/0079493 | A1 * | 4/2011 | Bell | B65G 21/2072 198/836.3 |
| 2017/0283176 | A1 | 10/2017 | Franzaroli | |
| 2024/0375884 | A1 * | 11/2024 | McCafferty | B65G 47/22 |
| 2025/0340383 | A1 * | 11/2025 | Ruckh | B65G 47/34 |

* cited by examiner

SYSTEMS FOR CONVEYING ARTICLES

CROSS-REFERENCE TO RELATED APPLICATIONS

This application claims the benefit and priority to International Application No. PCT/EP2023/058867, filed Apr. 4, 2023, which claims the benefit and priority to European Patent Application No. EP22382316.2 filed Apr. 4, 2022, each of which is incorporated by reference herein in its entirety.

FIELD

The present disclosure relates to methods and systems for conveying articles. The present disclosure more particularly relates to methods and systems for conveying articles comprising a displaceable wall portion configured to adjust the width of the conveyor. More particularly, the present disclosure relates to methods and systems for conveying articles in aseptic environments.

BACKGROUND

In order to bring down production costs of products that need to be treated under aseptic conditions, such as drugs and medicines, it is often necessary to automate processes related to the handling of containers comprising the same.

An aseptic environment is a necessary condition for the development and manufacturing of biotechnology and pharmaceutical products. An aseptic environment, and any task carried out inside dealing with corresponding products, must comply with standards of Good Manufacturing Practices (GMP). These GMP standards involve the manufacturing, processing, packaging or holding of a drug product. In this respect, there are several standards applicable to equipment in aseptic environments, see for example, EU GMP Part 1, annex1 and annex 15 or 21 CFR part 211 subpart D, in force in March 2022. There are also several design guidelines for equipment such as ASME BPE where comprehensive rules are summarized.

These standards and regulations require that said aseptic environments should be provided with equipment for adequate control over inter alia air pressure, micro-organisms, dust, humidity, and temperature. Further, these standards also state that air filtration systems must be used on air supplies to production areas. It is also generally required to take measures to control recirculation of particulate matter, i.e. dust and/or micro-organisms. Thus, adequate systems to control contaminants such as particulate matter from moving components or from lubricating systems must be provided.

A common approach to automatize the transport of vials and other containers aimed at storing drugs and medicines inside aseptic environments is by using automatic conveying systems. However, conveyors that operate in such aseptic environments must satisfy certain requirements that may not be relevant in other manufacturing environments.

Known conveying systems for aseptic environments generally comprise sidewalls that guide the product along the conveying direction and which limit the transverse motion of the products. The distance between the sidewalls is generally chosen such as to substantially match the width of the product and to only leave a small margin on each side of the product. Therefore, products may be transported along a conveyor in a single line, and the position of the product in a direction across the conveyor may at least be partially controlled. An example of such a conveying system may be arranged between a vial filling station and a freeze-drying station, or between a freeze-drying station and a capping station.

In some cases, the operators of an aseptic environment may require conveying a new product with different dimensions. With reference to the aforementioned example, after a batch of vials with first dimensions has been prepared and transported, a filling station may start to fill a batch of larger vials with a higher amount of content. When this occurs, in order to be able to transport the vials from the vial filling station to e.g. the freeze-drying station, the conveying system needs to be adapted so that the sidewalls substantially match the width of the new product.

To do so, the operators of the cleanroom generally stop the conveyor line, remove the sidewalls of the conveyor system, and install other sidewalls that leave a clearance between them that substantially corresponds to the width of the new product. These new elements evidently have to be sanitized in order to be used in that environment. This results in a tedious and time-consuming task that requires manual labor and can even propagate the contamination of the aseptic environment by the introduction of additional components, i.e. sidewalls, and operators moving in and out of the aseptic environment.

The present disclosure provides systems and methods that at least partially overcome some of the aforementioned drawbacks.

SUMMARY

In a first aspect of the present disclosure, a system for conveying articles in an aseptic environment is provided. The system for conveying articles comprises a conveyor belt, a first sidewall portion, a second sidewall portion and an actuator. The conveyor belt, and the first and second sidewall portions define a conveyor path portion. Further, at least one of the first and second sidewall portions is a displaceable wall portion. Thus, the at least one displaceable wall portion is configured to adjust a width of the conveyor path portion to a width of the conveyed article. The actuator is configured to move the displaceable wall portion such that the displaceable wall portion is maintained parallel to a displaceable wall portion that it faces. Additionally, the displaceable wall portion comprises a guided portion configured to be displaced along a guide.

In accordance with this aspect, the system for conveying articles allows to safely convey articles of different sizes using the same sidewall portions. The operators of the conveyor are not required to swap components, i.e. sidewall portions, of the system do adapt the width of the conveyor path portion in case e.g. another batch of articles is to be conveyed.

This can provide a considerable reduction in waiting times during production or handling of receptacles and products of different dimensions and can also reduce the aforementioned contamination related to operators replacing sidewall portions.

The conveyor path portion maintains a constant width, for practical purposes, along its length according to this aspect, i.e. the wall portion is maintained in parallel with a wall portion that it faces (which may or may not be displaceable as well). The displaceable wall portions may in particular be moved in a straight path.

In examples, the guided portion and the guide are configured to be sanitized according to GMP standards.

Further, the system disclosed is suitable for use in an aseptic environment. More precisely, the guided portion of the displaceable wall and the corresponding guide are configured to be cleaned and sanitized according to GMP standards. Thus, both the guided portion and the guide are configured to limit the deposition of debris, and are easy to clean and sanitize. These components substantially avoid difficult to reach areas, and may not include porous or reticulated materials. More precisely, the guided portion and the guide are configured in such a way that they may be effectively cleaned using a cloth containing a sanitizing solution such as distilled water or a solution comprising alcohol.

In the present disclosure, an actuator may be regarded as a component that is responsible for moving and controlling a mechanism or system. I.e. in the present disclosure, the actuator is the element that moves (directly or indirectly) a sidewall portion of the conveyor system. The actuator is powered or forced to move by a drive.

In the present disclosure, a drive may be regarded as a source of energy or power that is supplied to the actuator to move and control the movement of a mechanism. A drive may be e.g. an electric motor.

Throughout the present disclosure, "aseptic" may be understood to mean that an environment is free from contamination caused by particles and/or harmful bacteria, viruses, or other microorganisms and may in specific cases mean that an environment is surgically sterile or sterilized.

Throughout the present disclosure, "sanitizing" may be understood to refer to make something clean and free from bacteria and may include disinfecting.

In a second aspect, a method to adjust a width of a conveyor system in an aseptic environment is provided. The conveyor system comprises a conveyor belt, a first sidewall portion and a second sidewall portion. The method provided comprises displacing at least one of the first and second sidewall portions so that a distance between the first and second sidewall portions is modified. Further, the step of displacing at least one of the sidewall portions is carried out by an actuator that moves the sidewall portion. In addition, the at least one sidewall portion comprises a guided portion configured to be displaced along a guide. Additionally, the guided portion and the guide are configured to be cleaned and sanitized according to GMP standards.

Throughout the present disclosure, aseptic environments should be understood as those environments which comply with the Good Manufacturing Practices (GMP) for aseptic pharmaceutical products. The GMP for aseptic pharmaceutical products include standards for cleaning, sterilization, air filtration, clean air monitoring, microbiological and particulate cleanliness of air and surfaces, etc., Throughout the present disclosure, cleaning according to "GMP standards" should be understood as general regulations regarding aseptic environments, as may be found for example in EU GMP Part 1, annex1 and annex 15 or 21 CFR part 211 subpart D, in force in March 2022. More precisely, a component configured to be cleaned according to GMP standards should be understood as a component made of suitable materials and with certain geometric conditions that allow an effective cleaning and sanitization. In this context, a suitable material may be understood as a material that allows reaching sufficiently low levels of surface particle concentration, i.e. low number of individual particles per unit of surface area. This parameter may also depend on surface finish, capacity to be loaded electrostatically and others. Further, suitable materials may be highly resistant to chemical reactions, such as stainless steel, polytetrafluoroethylene (Teflon™), polyvinylidene, polypropylene, polyether ether ketone or perfluoroalkoxy alkane. Further, components configured to be cleaned according to GMP standards may not include shapes and surfaces that may tend to accumulate contaminants on the surface of the component, such as e.g. blind holes.

In this particular context therefore, the guide(s) and guided portion(s) of the sidewall may be made of one of the suitable materials mentioned above. Similarly, the sidewalls on either side of the conveyor belt(s) may be made of such materials as well. And generally, all components that are used in the aseptic environment may be made of such materials.

Additional objects, advantages and features of embodiments of the present disclosure will become apparent to those skilled in the art upon examination of the description, or may be learned by practice.

BRIEF DESCRIPTION OF THE DRAWINGS

Non-limiting examples of the present disclosure will be described in the following, with reference to the appended figures, in which.

DETAILED DESCRIPTION

Figure 1:
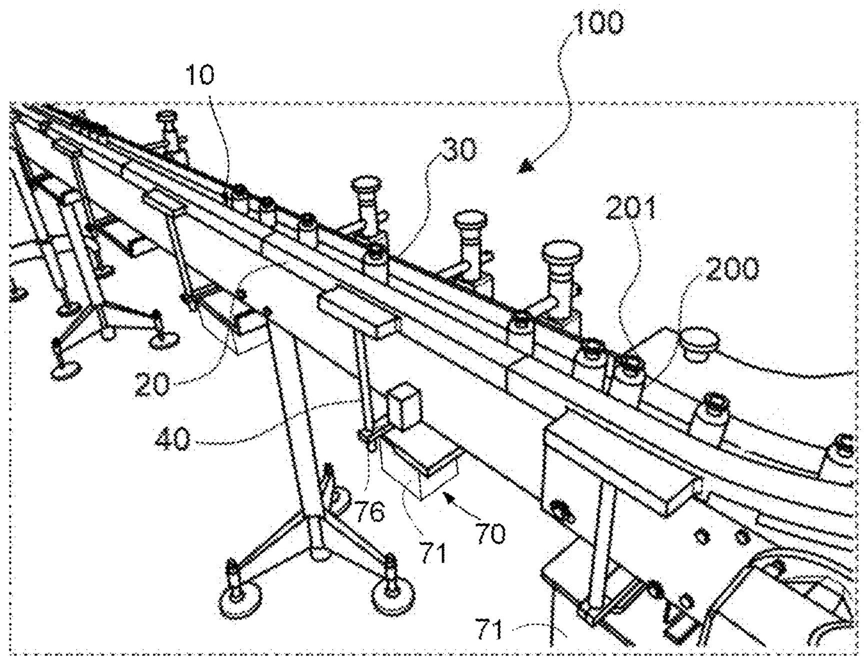
FIG. 1 schematically illustrates a perspective view of an example of a conveyor system according to the present disclosure, and particularly illustrates a straight conveyor portion of the system.

Reference now will be made in detail to embodiments of the disclosure, one or more examples of which are illustrated in the drawings. Each example is provided by way of explanation, not as a limitation. In fact, it will be apparent to those skilled in the art that various modifications and variations can be made in the present disclosure without departing from the scope or spirit of the teaching. For instance, features illustrated or described as part of one embodiment can be used with another embodiment to yield a still further embodiment. Thus, it is intended that the present disclosure covers such modifications and variations as come within the scope of the appended claims and their equivalents. In general, the same reference signs have been used to denote the same or similar elements across the figures.

Figure 2:
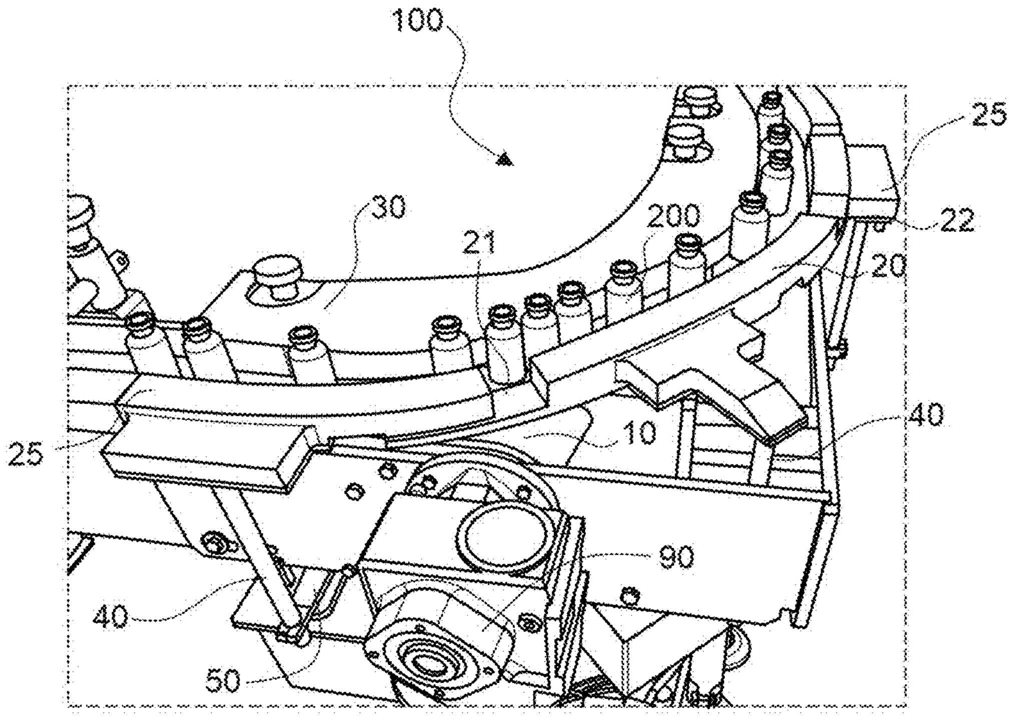
FIG. 2 schematically illustrates a perspective view of an example of a curved conveyor portion of the system in FIG. 1.
Figure 3:
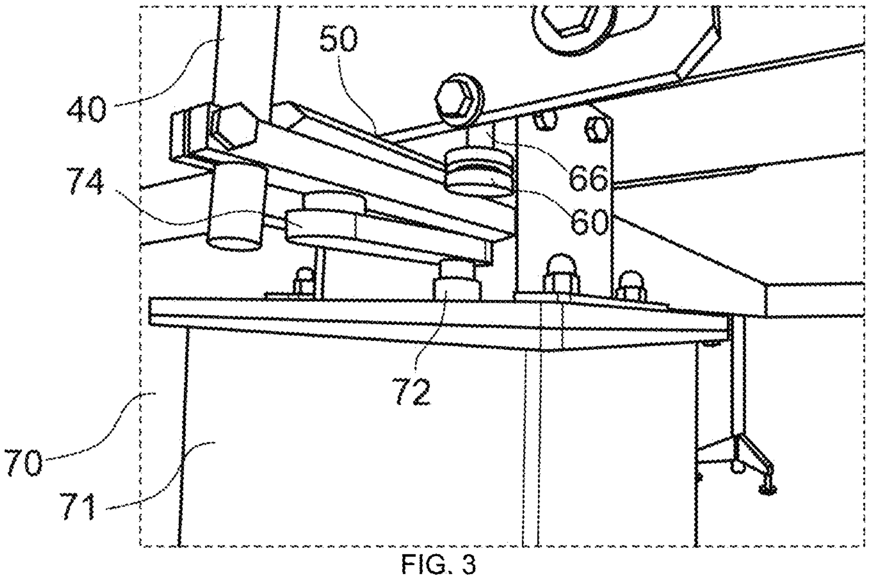
FIG. 3 schematically illustrates a detail view of the system in FIGS. 1 and 2, showing an example of an actuator and associated parts according to the present disclosure.

FIGS. 1-3 schematically illustrate an example of a system 100 for conveying articles 200 in an aseptic environment according to the present disclosure. FIG. 1 illustrates a first section of the system 100 including a straight conveyor portion, and FIG. 2 illustrates a curved conveyor portion, and FIG. 3 discloses a drive arrangement arranged underneath the conveyor path. The following description refers to the example of FIGS. 1-3.

The system 100 comprises at least one conveyor belt 10, a first sidewall portion 20 and a second sidewall portion 30. The at least one conveyor belt 10, and the first and second sidewall portions 20, 30 define a conveyor path portion. At least one of the first and second sidewall portions 20, 30 is a displaceable wall portion. The displaceable wall portion(s) is (are) configured to adjust a width of the conveyor path portion to a width of the conveyed article 200.

It is noted that the system 100 may comprise more than one conveyor belt. A plurality of conveyor belts may be arranged to provide a path from one workstation to a next. Each of the conveyor belts may transport articles along a straight line. At or near the end of such a conveyor belt, another conveyor belt may be arranged to transport the article further, possibly in a different direction. Between conveyor belts that are arranged to transport the article(s) in different directions, a suitable transition may be arranged, e.g., a rotating disc or plate as described hereinafter. In examples, the conveyor belts may be arranged in a substantially parallel arrangement, i.e. to create a wider conveying area. Such an arrangement may be used e.g. in combination with a discard unit described hereinafter.

The system 100 comprises an actuator 72 configured to move the displaceable wall portion in a straight path. Furthermore, the displaceable wall portion comprises a guided portion 50 configured to be displaced along a guide 60. Both the guided portion 50 and the guide 60 are configured to be cleaned according to GMP standards.

The actuator 72 in this example moves a bar 76 on which the guided portion 50 is mounted. The bar 76 is further connected to an upstanding rod 40. The upstanding rod 40 at its distal end is mechanically connected to the displaceable wall portion. Movement of the actuator 72 will result in a straight movement of the displaceable wall portion thanks to the guided portion 50 being arranged along a guide 60.

In further examples, the guided portion may be part of the actuator itself.

The actuator 72 may be driven by a drive 70, which may be e.g. an electric motor. When a new batch of articles with dimensions (and particularly a width) that is different from previous articles is to be handled, an operator may set a new width. E.g. a touchscreen or any other type of user interface may be used. Once the system 100 registers the new width, control signals are sent to drive 70 (and other drives of the same conveyor system 100) to drive the actuators 72 such that a width of the conveyor portion is adapted.

The first sidewall portion 20 or the second sidewall portion 30 or both the sidewall portions may be driven to adjust the width of the conveyor path. In such a case each of the sidewall portions 20, 30 can have independent actuators and independent drives 70.

The articles 200 in this example may be vials or small bottles. They may be transported while partially open, or close and may contain e.g. biological or pharmaceutical compositions. In one example, the articles 200 may be vials containing a liquid composition which are conveyed towards a freeze-drying system.

The guide(s) in these examples allow by themselves, or in combination with other guides only a linear displacement, i.e. the system has only one degree of freedom.

In the example shown in FIG. 1, the first and second sidewall portions 20, 30 may be made of at least one of stainless steel, polytetrafluoroethylene (Teflon™), polyvinylidene, polypropylene, polyether ether ketone, perfluoroalkoxy alkane, although other suitable materials could be also used. These materials have an excellent chemical resistance and can be used to manufacture components with a relatively smooth surface finish and bespoke geometries. These features limit the accumulation of debris and simplify the task of cleaning and sterilizing them. A measure of the surface finish may be determined by arithmetic average roughness, i.e. Ra, or geometric average roughness, i.e. Root Mean Square. Further, many instruments can be used to determine surface roughness, including averaging instruments and surface profiling instruments. The first and second sidewall portions 20, 30 may have a surface roughness of approximately less than 0.8 μm (arithmetic average roughness), specifically less than 0.2 μm (arithmetic average roughness) and more specifically less than 0.1 μm (arithmetic average roughness) taken with a conservative measuring instrument, i.e. a surface profiling instrument, or even smaller values if taken with an averaging instrument which is not sensitive to surface waviness.

The example of FIGS. 1-3 also shows that the actuator 72 may be arranged at a lower vertical level than a neck 201 of the articles 200. Specifically the whole transmission from drive to guided portion, including any linkages in between, may be arranged at a lower vertical level than a neck 201 of the articles 200 to be conveyed. This arrangement reduces the risk of particulate matter generated, or put in air circulation, by the actuator 72 (or by other elements connected to the actuator 72 and in particular further elements arranged between the drive and the actuator) to reach the interior of the receptacles 200. The probability of a particle coming from the actuator 72 to reach the interior of the receptacle 200 is even more reduced when this arrangement is provided in a cleanroom with vertical air current. E.g. the conveyor systems 100 according to the present disclosure may be used in environments with a laminar air flow ceiling.

FIG. 2 schematically illustrates another section of the system 100 for conveying articles 200 in an aseptic environment according to the present disclosure. More precisely, FIG. 2 shows a curved section of the system 100. Thus, the system 100 may define a straight conveyor section (FIG. 1) and a curved conveyor section.

The system may further comprise further straight conveyor sections arranged downstream of the curved conveyor section. E.g. a first straight conveyor section may form an approximately 90 degree angle with a further straight conveyor section. In between the first and further straight conveyor sections, a curved conveyor section may be arranged. In some examples, the first conveyor section may include a first conveyor belt, the further conveyor section a further conveyor belt, and a rotating circular plate with an independent drive may connect the first and further conveyor sections.

The straight conveyor section in this example may comprise a first displaceable wall portion, i.e. at least one of the sidewall portions as previously illustrated; and the curved conveyor section may comprise a second displaceable wall portion, i.e. at least one of the curved sidewall portions 20, 30. A curved sidewall portion may herein be regarded as a sidewall portion which has at least a curved portion. A curved sidewall portion may have a sidewall with a constant curvature, and in other examples a curved sidewall portion may have a sidewall with a straight portion and one or more curved portions, e.g. curved end portions.

The system 100 in FIG. 2 of this example shows that the curved conveyor section also comprises a curved wall portion with curved ends 20 that is arranged in a staggered configuration with respect to a neighboring wall portion 25.

In the present example, the neighboring wall portion 25 is a wall portion with one curved end, but in other embodiments the neighboring wall portion 25 may be a straight wall portion. This arrangement between wall portions 20, 25 allows them to move in different directions to adjust the width of the conveyor path portion without generating gaps between them in the horizontal direction. Each of the sidewall portions 20, 25 may be driven linearly i.e. in a straight path.

In some examples, the curved wall portion 20 may be arranged with the two ends 21, 22 below the respective ends of the neighboring wall portions 25, with the two ends 21, 22 above the respective ends of the neighboring wall portions or with one end 21 below and another end 22 above the respective ends of the neighboring wall portions 25. In examples, each end 21, 22 may be mechanically connected to the respective ends of the neighboring wall portion 25, i.e. with a rotatable link, to allow relative motion between wall portions 20, 25 and promote a synchronized motion.

FIG. 2 also illustrates the drive system 90 of the conveyor belt 10. In the present example, the receptacles 200 transition from a first conveyor belt 10 to a second conveyor belt by means of a rotating element (like a disc or plate, not further shown) that rotates within the plane defined by the first and second conveyor belts. Alternatively, other systems to transition the receptacles 200 from one conveyor belt to another conveyor belt may also be employed.

FIG. 3 schematically illustrates a detailed view of an actuator 72 and corresponding drive 70 of a system 100 according to the present invention. More specifically, FIG. 3 shows that the system 100 may comprise a drive 70 arranged at a lower vertical level than the actuator 72.

Additionally, the embodiment in FIG. 3 shows that the drive 70 is enclosed in a casing 71. Both the casing 71 and the arrangement of the drive 70 below the actuator 72 reduce the likeliness of contamination of the contents of the articles which are conveyed i.e. even if a particle, or dust is generated, or put into air circulation, by the drive 70 or by the actuator 72, it can still be avoided that such particles reach the interior of the articles 200, specifically when used in combination with a laminar air flow ceiling. The casing 71 may be made e.g. of stainless steel.

The system 100 may comprise one or more rotatable linkages 74 configured to connect the actuator 72 with the bar 76 on which the guided portion 50 is mounted and contributing to transform the rotation of the actuator 72 into the linear motion of the upstanding rod 40, and, consequently, of the displaceable wall portion. In the present example, the actuator 72 is orientated substantially vertically, but other orientations and rotatable linkages 74 may be used to transform the rotation of the actuator 72 into a linear horizontal motion of the upstanding rod 40.

The use of rotatable linkages and/or rotatable actuators (instead of e.g. gears, or pistons) makes the system more suitable for aseptic environments, as the geometries of these elements avoid blind holes, difficult to clean areas etc. Moreover, in aseptic environments, liquid lubricants or pasty lubricants (e.g. grease, oil) are to be avoided as much as possible.

Figure 4:
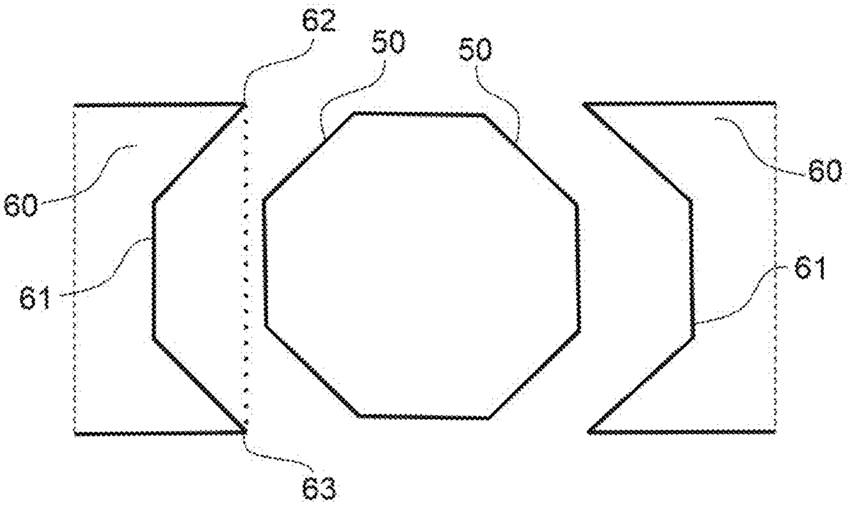
FIG. 4 schematically illustrates a cross-section view of an example of a guide and guide portion of another system according to the present disclosure.

FIG. 4 schematically illustrates a cross-sectional view of a guide 60 and guided portion 50 of a displaceable wall portion according to the present disclosure. In the illustrated example, the displaceable wall portion (not shown) comprises two guided portions 50, and the guided portions 50 are configured to be displaced along corresponding guides 60. In FIG. 4, the geometry of the guides 60 and guided portions 50 is faceted, but a geometry with a curved cross-section may also be used. Note that the edges of the guided portions 50 and the guide 60 have been illustrated as if these do not contact each other to reduce clutter.

Further, FIG. 4 shows that the guide 60 may have an open cross-section, i.e. the guided portion 50 is "cantilever" mounted in the individual guide 60. This improves access and therefore cleanability of the guide 60, i.e. the guide 60 can be cleaned using cleaning devices compatible with an aseptic environment, such as a cloth or others. A second guide 60 with an open cross-section that faces the open side of the first guide 60 may be provided. Guided portion 50 may be guided by both the first and second guides 60.

The open cross-section of the guide 60 in this example is delimited by an open line 61, i.e. along the periphery of the guide 60, which extends from a first end 62 of the open cross-section to a second end 63 of the open cross-section. Furthermore, the ratio defined by the length of the open line 61 to the shortest distance between the first and second ends 62, 63 of the open line (illustrated with a broken line) may be smaller than 2.2, specifically smaller than 2 and more specifically smaller than 1.75.

In examples, the guide 60 may have a substantially axisymmetric geometry. Further, the guide 60 may be rotatably mounted, e.g. the guide 60 may be configured to rotate about a support 66. The guide 60 may thus rotate as the guided portion is moved by the corresponding actuator(s). The rotation of the guide 60 relative to the guided portion 50 allows cleaning the surface of these two components, i.e. guide 60 and guided portion 50, without the need for disassembling them. This configuration may prevent the existence of hard-to-reach contact surfaces where debris may accumulate and pollute the remaining components of the system.

In some examples, the guide 60 may have a perimeter which is substantially smaller than the length of the path of the guided portion 50. More specifically, the perimeter may be at least 2 times smaller than length of the path of the guided portion 50, and more specifically at least 5 times smaller. This enables effective cleaning of the guides 60 that rotate with the linear motion of the guided portion 50 and reduce the potential accumulation of debris inside the guide 60.

Figure 5:
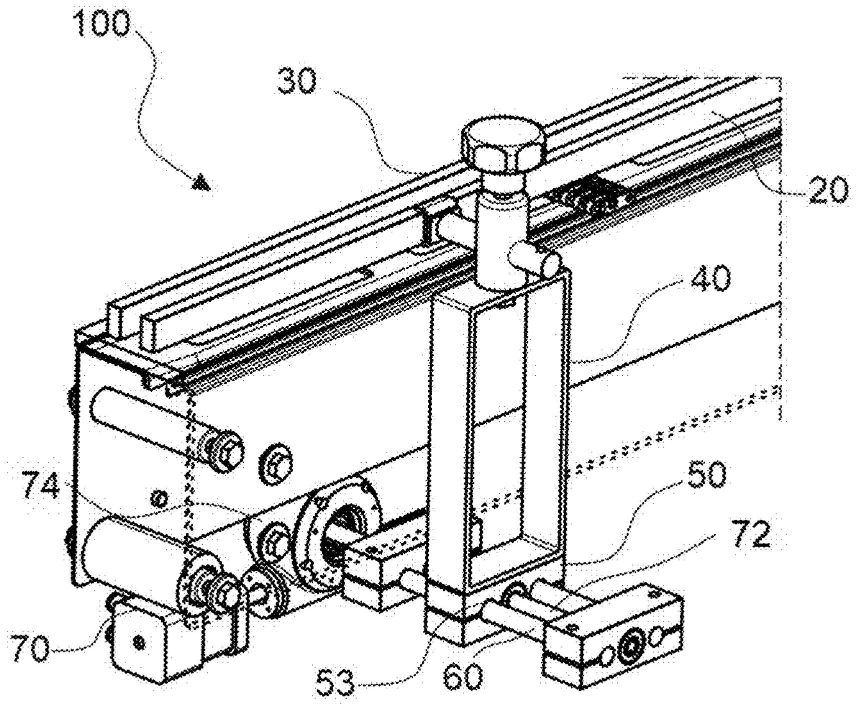
FIG. 5 schematically illustrates a perspective view of an additional example of a guide and guide portion of another system according to the present disclosure.

FIG. 5 illustrates another example of a system 100 according to the present disclosure. In this example, the system 100 comprises a first and second sidewall portions 20, 30. Further, the first sidewall portion 20 is a displaceable sidewall portion that is mechanically connected with an upstanding portion 40. Further, the system 100 comprises an actuator 72 which is part of a linear slide mechanism.

The first sidewall portion 20 comprises a guided portion 50 with a through hole 53 defining a depth and a perimeter. The guides 60 in this case are rods which are configured to be inserted into the respective through holes 53 to guide the displacement of the guided portion. In the present example, the guided portion 50 comprises two through holes 53 through which the corresponding guides 60 are configured to be inserted, but the number of guided portions and guides may be varied.

In other examples, the guide 60 might comprise a through hole and the guided portion 50 may be configured to be inserted into the through hole.

In examples, the length of the path of the guided portion 50 is larger than the depth of the through hole 53, specifically at least 5 times larger than the depth of the through hole 53, and more specifically at least 10 times larger. This enables effectively cleaning the guides 60 that run along the through holes 53 and reduce the potential accumulation of debris inside the through hole 53.

FIG. 5 also shows an alternative embodiment for the drive 70 illustrated in FIG. 3. In the present example, the drive 70 which may be e.g. a stepper motor is connected to a transfer case 74 which at the same time is connected to the actuator 72, e.g. a worm screw. Rotation of the actuator 72 results in movement of guided portion 50 and thereby in movement of the sidewall portion 20.

Figure 6:
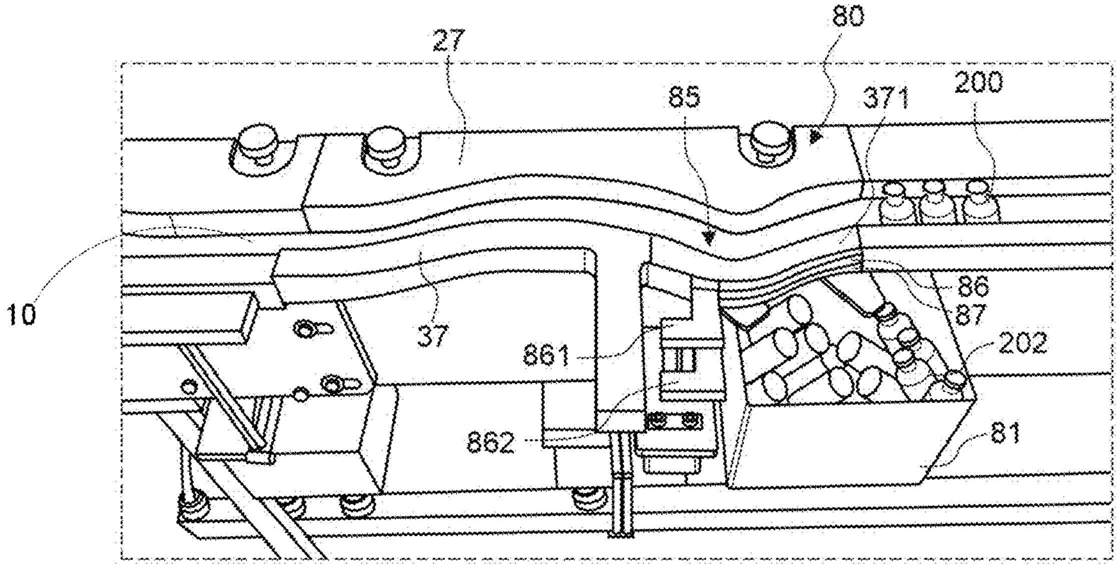
FIG. 6 schematically illustrates a perspective view of an example of discard unit of the system shown in FIGS. 1-3.

FIG. 6 is a perspective view of another section of a system 100 according to an example of the present disclosure. More specifically, the illustrated section of the system 100 comprises a discard unit 80 configured to remove articles 202 that have tipped over from the at least one conveyor belt 10. The discard unit 80 may be located in a substantially straight section or in a curved section of the conveyor system 100.

In this example, the discard unit 80 comprises a first and second curved sidewall portions 27, 37 arranged opposite to each other, and defining, for practical purposes, a substantially constant width of the conveyor path. Further, the first curved sidewall portion 27 is configured to promote the displacement of the article 200 across (i.e. transverse to) the conveyor belt 10 arranged along this stretch of the conveyor path.

The second curved sidewall portion 37 has a sidewall segment with an opening, wherein the opening has a height above a plane defined by the conveyor belt 10 such that a tipped over article 202 passes through the opening.

In this example, a sidewall segment 371 is spaced above the plane defined by the conveyor belt 10 at a distance such that a tipped over article 202 can pass below the sidewall segment 371. I.e. the height of the space or gap may be just in excess of a maximum lateral, outside dimension of the articles 200 being conveyed. Thus, an article 202 that has tipped over may pass below the segment 371 into a discard tray 81, whereas upright articles 200 may follow the conveyor path.

In the exemplary embodiment of FIG. 6, the discard unit 80 comprises a shutter 85 located between the second curved sidewall portion 37 and the conveyor belt 10. The shutter 85 is configured to at least partially obstruct the vertical gap between the conveyor belt 10 and the segment 371. The shutter 85 may comprise a plurality of bodies 86, 87 arranged on top of each other and configured to operate independently to adjust the vertical gap between the conveyor belt 10 and the sidewall segment 371. In this example, two bodies 86, 87 are shown, but in other examples more than two bodies may be used.

In the illustrated embodiment, the operation of the bodies 86, 87 may be carried out by the rotation of their respective ends 861, 862. Other arrangements to operate the bodies 86, 87 of the shutter 85 can also be employed.

Further, the shutter 85 may be automatically driven to rotate one or more bodies 86, 87 from their open position to a closed position, or from a closed position to an open position.

The discard unit 80 or segment 371 of the conveyor system may be combined with any of the examples of FIGS. 1 and 5. When an operator prepares the conveyor system 100 for another batch of articles 200 of different dimensions, the width of the conveyor path is adapted automatically. As mentioned before, an operator may set a new width of the articles 200 to be conveyed using a suitable user interface. . . . In response, the height of the gap in the sidewall portion of the discard unit 80 can be automatically adapted.

In some examples, the system 100 may be adapted for conveying articles 200 of e.g. two, three or four or more standard dimensions. When preparing the system 100 for a new batch of articles 200, simply one of the predefined articles 200 may be selected. In these examples, as the width of the conveyor portion is adapted, automatically shutter bodies 86, 87 are moved to their open or closed position to increase or reduce the height of the gap or opening in the sidewall. In yet further examples, the system 100 may comprise an imaging system to determine the dimensions of the articles to be conveyed.

In any of the previously illustrated examples, the height of the first and second sidewall portions 20, 30 may be adjustable relative to the conveyor belt 10. This allows placing the first and second sidewall portions 20, 30 to extend vertically higher than the center of gravity of the receptacles 200 being conveyed (for a broad type of receptacles and dimensions). This reduces the risk of a receptacle being tipped over the sidewall portions 20, 30 to ground.

Figure 7:
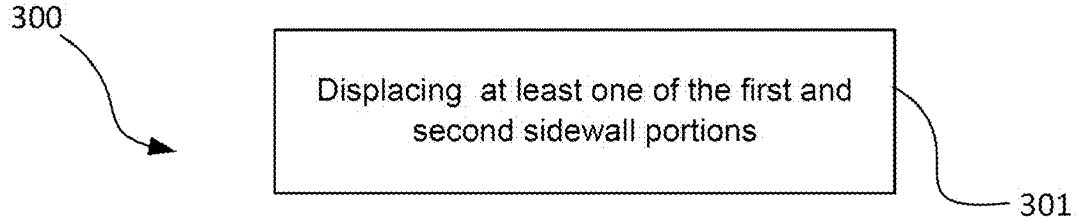
FIG. 7 shows a block diagram of an example of a method according to the present disclosure.

FIG. 7 is a flow diagram of a method 300 to adjust a width of a conveyor system 100 according to the present disclosure. The conveyor system comprises at least one conveyor belt 10, and a first and second sidewall portion 20, 30. The method 300 comprises, at block 301, displacing at least one of the first and second sidewall portions 20, 30 so that a distance between the first and second sidewall portions 20, 30 is modified. The displacing is carried out by an actuator 72 that moves the at least one sidewall portion 20, 30. Further, the at least one sidewall portion 20, 30 comprises a guided portion 50 configured to be displaced along a guide 60. Additionally, the guided portion 50 and the guide 60 are configured to be cleaned according to GMP standards.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

Embodiments are disclosed in the following clauses.

Clause 1. A system (100) for conveying articles (200) in an aseptic environment comprising a conveyor belt (10), a first sidewall portion (20) and a second sidewall portion (30), wherein

- the conveyor belt (10), and the first and second sidewall portions (20, 30) define a conveyor path portion;
- at least one of the first and second sidewall portions (20, 30) is a displaceable wall portion, and it is configured to adjust a width of the conveyor path portion to a width of the conveyed article (200); and
- the system (100) further comprises an actuator (72) configured to move the displaceable wall portion such that the displaceable wall portion is maintained parallel to a displaceable wall portion that it faces, wherein
- the displaceable wall portion comprises a guided portion (50) configured to be displaced along a guide (60), wherein the guided portion (50) and the guide (60) are configured to be sanitized according to GMP standards.

Clause 2. The system (100) according to clause 1, wherein the guide (60) has an open cross-section.

Clause 3. The system (100) according to clause 2, wherein the open cross-section is delimited by an open line (61) which extends from a first end (62) of the open cross-section to a second end (63) of the open cross-section, and wherein a ratio of a length of the open line (61) to a shortest distance between the first and second ends (62, 63) of the open line is smaller than 2.2 specially smaller than 2, and more specifically smaller than 1.75.

Clause 4. The system (100) according to any of clauses 2 or 3, wherein the displaceable wall portion comprises at least two guided portions (50), each guided portion (50) being configured to be displaced along a corresponding guide (60).

Clause 5. The system (100) according to any of clauses 1-4, wherein on of the guide (60) and guided portion (50) comprises a through hole (53), defining a depth and a perimeter, through which the other one of the guide (60) and guided portion (50) is configured to be inserted.

Clause 6. The system (100) according to clause 5, wherein a length of a path of the guided portion (50) is larger than the depth of the through hole (53), and more specifically 10 times or more larger than the depth of the through hole (53).

Clause 7. The system (100) according to any of clauses 1-6, wherein the actuator (72) is arranged at a lower vertical level than a neck (201) of the articles (200).

Clause 8. The system (100) according to any of clauses 1-7, wherein the system (100) further comprises a drive (70) arranged at a lower vertical level than the actuator (72) and mechanically coupled with the actuator (72).

Clause 9. The system (100) according to any of clauses 1-8, wherein the actuator is configured to move the displaceable wall portion in a straight path.

Clause 10. The system (100) according to clause 9, wherein the system (100) further comprises one or more rotatable linkages (74) configured to connect the actuator (72) with the bar (76) on which the guided portion (50) is mounted.

Clause 11. The system (100) according to any of clauses 1-10, wherein the system (100) defines a straight conveyor section and a curved conveyor section, and wherein the straight conveyor section comprises a first displaceable wall portion and the curved conveyor section comprises a second displaceable wall portion.

Clause 12. The system (100) according to clause 11, wherein the curved conveyor section comprises a curved wall portion, which is arranged in a staggered configuration with respect to a neighboring wall portion (25).

Clause 13. The system (100) according to any of clauses 1-12, further comprising a discard unit (80) configured to remove tipped articles (202) from the system, wherein the discard unit (80) comprises a first and second curved sidewall portions (27, 37) arranged one opposite to the other, wherein the first curved sidewall portion (27) is configured to promote the displacement of the article (200) across a conveyor belt (10), and the second curved sidewall portion (37) has a sidewall segment (371) with an opening having a height such that a tipped over article (202) can pass through the opening.

Clause 14. The system (100) according to clause 13, wherein the discard unit (80) comprises a shutter (85) located between the second curved sidewall portion (37) and the conveyor belt (10), the shutter (85) configured to be automatically activated.

Clause 15. A method (300) to adjust a width of a conveyor system (100) in an aseptic environment comprising at least one conveyor belt (10), a first sidewall portion (20) and a second sidewall portion (30), the method (300) comprising:

displacing (301) at least one of the first and second sidewall portions (20, 30) so that a distance between the first and second sidewall portions (20, 30) is modified, wherein the displacing (301) is carried out by an actuator (72) that moves the at least one sidewall portion (20, 30); and wherein the at least one sidewall portion (20, 30) comprises a guided portion (50) configured to be displaced along a guide (60), the guided portion (50) and the guide (60) being configured to be cleaned according to GMP standards.

The invention claimed is:

1. A system for conveying articles in an aseptic environment, the system comprising a conveyor belt, a first sidewall portion and a second sidewall portion, wherein the conveyor belt, and the first and second sidewall portions define a conveyor path portion; at least one of the first and second sidewall portions is a displaceable wall portion, and is configured to adjust a width of the conveyor path portion to a width of the conveyed article; and wherein the system further comprises an actuator configured to move the displaceable wall portion such that the displaceable wall portion is maintained parallel to a wall portion that it faces, wherein the displaceable wall portion comprises a guided portion configured to be displaced along a guide having an open cross-section.

2. The system according to claim 1, wherein the open cross-section is delimited by an open line which extends from a first end of the open cross-section to a second end of the open cross-section, and wherein a ratio of a length of the open line to a shortest distance between the first and second ends of the open line is smaller than 2.2.

3. The system according to claim 1, wherein the articles have a neck, and wherein the actuator is arranged at a lower vertical level than the neck of the articles.

4. The system according to claim 3, wherein the system further comprises a drive which is arranged at a lower vertical level than the actuator and which is mechanically coupled with the actuator.

5. The system according to claim 1, wherein the actuator is configured to move the displaceable wall portion in a straight path.

6. The system according to claim 5, wherein the system further comprises one or more rotatable linkages configured to connect the actuator with a bar on which the guided portion is mounted.

7. The system according to claim 1, wherein the open cross-section is delimited by an open line which extends from a first end of the open cross-section to a second end of the open cross-section, and wherein a ratio of a length of the open line to a shortest distance between the first and second ends of the open line is smaller than 2.0.

8. The system according to claim 1, wherein the open cross-section is delimited by an open line which extends from a first end of the open cross-section to a second end of the open cross-section, and wherein a ratio of a length of the open line to a shortest distance between the first and second ends of the open line is smaller than 1.75.

9. A system for conveying articles in an aseptic environment, the system comprising a conveyor belt, a first sidewall portion and a second sidewall portion, wherein the conveyor belt, and the first and second sidewall portions define a conveyor path portion;

at least one of the first and second sidewall portions is a displaceable wall portion, and is configured to adjust a width of the conveyor path portion to a width of the conveyed article; and wherein the system further comprises an actuator configured to move the displaceable wall portion such that the displaceable wall portion is maintained parallel to a wall portion that it faces, wherein the displaceable wall portion comprises a guided portion configured to be displaced along a guide;

the system defines a straight conveyor section and a curved conveyor section, and wherein the straight conveyor section comprises the first displaceable wall portion and the curved conveyor section comprises a second displaceable wall portion;

the system further comprising a discard unit configured to remove tipped articles from the system, wherein the discard unit comprises a first and second curved sidewall portions arranged one opposite to the other, wherein the first curved sidewall portion is configured to promote the displacement of the article across a conveyor belt, and the second curved sidewall portion has a sidewall segment with an opening having a height such that a tipped over article can pass through the opening.

10. The system according to claim 9, wherein the curved conveyor section comprises a curved wall portion, which is arranged in a staggered configuration with respect to a neighboring wall portion.

11. The system according to claim 9, wherein the discard unit comprises a shutter located between the second curved sidewall portion and the conveyor belt, wherein the shutter is configured to be automatically activated.

12. A method for adjusting a width of a conveyor system in an aseptic environment, the conveyor system comprising at least one conveyor belt, a first sidewall portion and a second sidewall portion, and the method comprising:

displacing at least one of the first and second sidewall portions so that a distance between the first and second sidewall portions is modified, wherein the displacing is carried out by an actuator that moves the at least one sidewall portion; and wherein the at least one sidewall portion comprises a guided portion configured to be displaced along a guide having an open cross-section.

13. The method according to claim 12, wherein the articles have a neck, and wherein the actuator is arranged at a lower vertical level than the neck of the articles.

14. The method according to claim 13, wherein the system further comprises a drive which is arranged at a lower vertical level than the actuator and which is mechanically coupled with the actuator.

15. The method according to claim 12, wherein the open cross-section is delimited by an open line which extends from a first end of the open cross-section to a second end of the open cross-section, and wherein a ratio of a length of the open line to a shortest distance between the first and second ends of the open line is smaller than 2.2.

16. The method according to claim 12, wherein the actuator is configured to move the displaceable wall portion in a straight path, and wherein the system further comprises one or more rotatable linkages configured to connect the actuator with a bar on which the guided portion is mounted.

17. The method according to claim 12, wherein the open cross-section is delimited by an open line which extends from a first end of the open cross-section to a second end of the open cross-section, and wherein a ratio of a length of the open line to a shortest distance between the first and second ends of the open line is smaller than 2.0.

18. The method according to claim 12, wherein the open cross-section is delimited by an open line which extends from a first end of the open cross-section to a second end of the open cross-section, and wherein a ratio of a length of the open line to a shortest distance between the first and second ends of the open line is smaller than 1.75.

* * * * *